United States Patent [19]

Kuroiwa

[11] Patent Number: 4,741,388

[45] Date of Patent: May 3, 1988

[54] UNDERGROUND HEAT EXCHANGING APPARATUS

[76] Inventor: Kazuo Kuroiwa, 750-186, Shirane-cho, Asahi-ku, Yokohama-shi, Kanagawa-ken, Japan

[21] Appl. No.: 808,800

[22] Filed: Dec. 13, 1985

[30] Foreign Application Priority Data

Dec. 20, 1984 [JP] Japan ............................. 59-267444
Jan. 5, 1985 [JP] Japan ....................................... 60-39

[51] Int. Cl.⁴ .............................................. F25D 23/12
[52] U.S. Cl. ........................................ 165/45; 62/260
[58] Field of Search ......................... 165/45; 62/260

[56] References Cited

U.S. PATENT DOCUMENTS

| | | | |
|---|---|---|---|
| 4,128,204 | 12/1978 | Wade | 165/45 X |
| 4,255,936 | 3/1981 | Cochran | 165/45 X |
| 4,279,291 | 7/1981 | Lambert | 165/45 X |
| 4,347,894 | 9/1982 | Gerlach | 165/76 |
| 4,369,635 | 1/1983 | Lambert | 165/45 X |
| 4,392,531 | 7/1983 | Ippolito | 165/45 X |
| 4,452,303 | 6/1984 | Bontje et al. | 165/45 X |

Primary Examiner—Albert W. Davis, Jr.
Assistant Examiner—Richard. R. Cole
Attorney, Agent, or Firm—Beveridge, DeGrandi & Weilacher

[57] ABSTRACT

A new and unique underground heat exchanging apparatus of the type including a first heat insulating tube and a second heat exchangeable tube connected to the former at the lower end of the latter. Both the first and second tubes are inserted downwardly into a deep hole drilled in the ground. The apparatus is operated by utilizing the excellent heat conservation and the huge heat capacity inherent to the underground. The first tube is located at the center of the hole and the second tube extends about the first tube in a spiral configuration. A liquified gas is introduced into both the first and second tubes. Heat exchanging is achieved between the second tube and the surrounding underground. To recirculate the liquified gas through the tubing system a heat exchanging unit including compressor and an expansion valve or the like is mounted on the ground surface. When the apparatus is used in a heating cycle, thermal energy is transferred from the underground to the second tube. On the other hand, when the apparatus is in a cooling system, heat is transferred from the second tube to the underground.

10 Claims, 5 Drawing Sheets

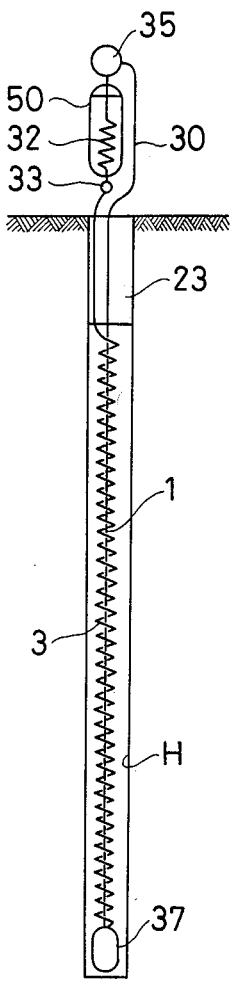

UNDERGROUND HEAT EXCHANGING APPARATUS

BACKGROUND OF THE INVENTION

The present invention relates to an underground heat exchanging apparatus for carrying out various functions such as cooling, heating, refrigerating and hot water feeding by effectively utilizing the excellent heat conservation and the huge heat capacity underground.

As is well known, underground temperatures are maintained at a stable level throughout all seasons and are little affected by atmospheric temperature. In practice the underground zone located at a distance of 5 to 6 meters as measured from the ground surface has a substantially consant temperature. It has been found as a result or practical measurements that the surface temperature of the ground varies as atmospheric temperature varies but that the temperature at a deep, underground position is higher in the winter than in the summer. This is attributable to a huge heat capacity underground. During summer, this surface zone of the ground is warmed under hot sunshine and thus stored thermal energy is gradually transmitted to a deep zone underground with the time delay in the winter to heat the latter, and thereby resulting in the above-mentioned peculiar phenomenon. This means that temperature in the deep zone in the underground is kept at a level opposite to that in the atmosphere due to time lag in the transmittance of thermal energy. Thus, the underground has more stable temperature in the deeper zone but as the depth as measured from the ground surface increases further, underground temperatures gradually increase due to the influence of heat conduction from the magma layer in the earth. It should be noted that heat exchanging is achieved quickly because of underground water.

SUMMARY OF THE INVENTION

Thus, the present invention has been made in view of the above-mentioned fact that the excellent heat conservation and huge heat capacity underground are hitherto very seldom utilized for practical use and its object resides in providing an underground heat exchanging apparatus which assures that the benefits of the underground as mentioned above are utilized simply and effectively.

To accomplish the above object there is proposed according to the present invention an underground heat exchanging apparatus of the type which is not concerned with the surface area on the ground where temperature varies significantly in dependence upon the atmospheric temperature but with a deep underground zone where heat exchanging with underground water is effected effectively.

Thus, the present invention has proposed an underground heat exchange apparatus which is operated while it is held in a deep hole drilled in the underground. Specifically, the apparatus of the invention is characterized in that a first heat insulating tube and a second heat exchangeable tube connected to the former are inserted downwardly into the deep hole underground and they are connected to a recirculating tubing system including a heat exchanging unit and other units on the ground, wherein both the first and second tubes a liquified or liquidized gas which functions as a heat exchanging medium. Due to the arrangement of the apparatus heat exchanging is achieved between soil and underground water in the underground and the heat exchanging unit on the ground surface with the aid of a recirculating liquidized gas in both the first and second tubes whereby heat conservation and the huge heat capacity of the underground is fully utilized.

Other objects, features and advantages of the present invention will be readily apparent from reading the following description which has been prepared in conjunction with the accompanying drawings.

BRIEF DESCRIPTION OF THE DRAWINGS

The accompanying drawings will be briefly described below.

FIG. 7 is another view, similar to FIGS. 1-3, of still another embodiment in accordance with the present invention.

DESCRIPTION OF THE PREFERRED EMBODIMENTS

Now, the present invention will be described in a greater detail hereunder with reference to the accompanying drawings which illustrate preferred embodiments thereof.

Figure 1:
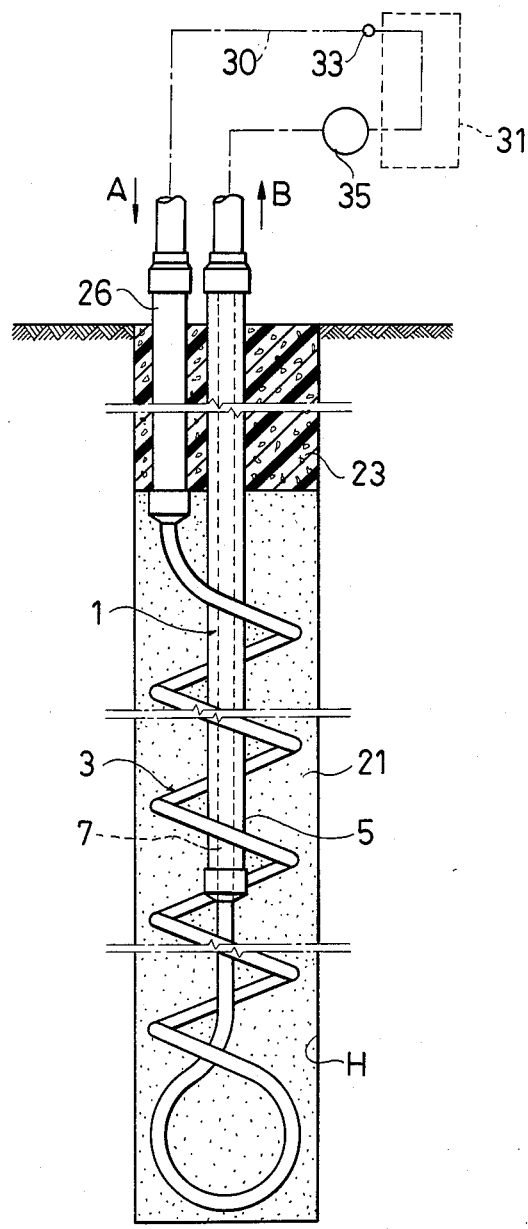
FIG. 1 is an elevational, front, cut-away view of an underground heat exchanging apparatus in accordance with an embodiment of the invention, particularly illustrating how the apparatus is constructed.

FIG. 1 is a vertical sectional view of the whole apparatus which schematically illustrates the structure thereof. As is apparent from the drawing, the apparatus includes a first tube 1 and a second tube 3 both of which are inserted downwardly into a deep bore hole H in the ground. It should be noted that the term "deep hole" cannot be specified in such a manner as deeper than several meters or the like using a certain number in depth and therefore it conceptionally represents a depth at which ground temperature is maintained within a certain range without any marked fluctuation caused by variation of the atmospheric temperature. Obviously, it differs in dependence on the district where the hole is bored and it is generally preferable that it is of a depth deeper than 10 meters for instance.

The first tube 1 is a thermally insulative tube and generally functions as center tube. On the other hand, the second tube 3 is a heat exchangeable tube which is connected to the lower end of the first tube 1. As shown in the drawing, the second tube 3 has a lower extension which is bent back toward the lower end of the first tube 1. Specifically, the second tube 3 is designed in the form of spiral tube which spirally extends about the first tube 1 as shown in FIG. 1. Further, the lower extension of the second tube 3, located downwardly of the first tube, is bent spirally.

Figure 2:
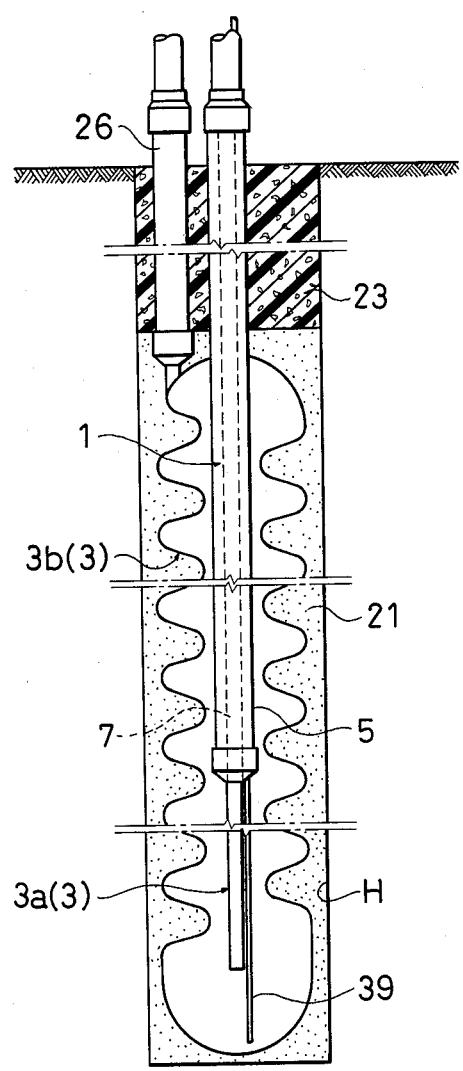
FIG. 2 is a view, similar to FIG. 1, of a second embodiment in accordance with the present invention.

Alternatively, the present invention may be embodied as illustrated in FIG. 2. In this embodiment the second tube 3 is a combination of a straight tube 3a connected to the lower end of the first tube 1 and a spirally corrugated tube 3b which defines a spiral passage between the latter and the straight tube 3a as well as the first tube 1. The spirally corrugated tube 3b may form a spiral passage as it comes in close contact with the straight tube 3a and the first tube 1. Alternatively, the former may be spaced away from the latter at a certain distance in order to form an annular passage inwardly of the spiral passage. After all, what is to be done is that the thermally insulative first tube 1 is jointed to the heat exchangeable tube 3 at a properly determined position so as to ensure that sufficient heat exchanging is effected via the second tube 3.

Figure 4:
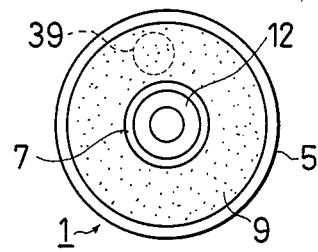
FIG. 4 is an enlarged, cross-sectional view of a first tube used for the apparatus of the present invention.
Figure 5:
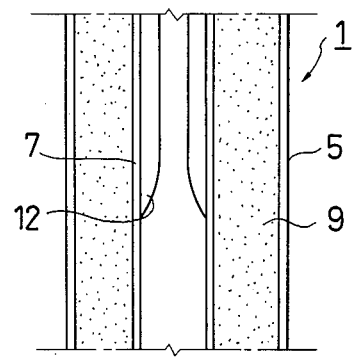
FIG. 5 is an elevational, cut-away sectional view of the first tube of FIG. 4, particularly illustrating how a throttle is disposed in the first tube.

It is preferable that the first tube 1 is designed in the form of straight tube which extends through the hole H in a substantially vertical direction. As shown in FIGS. 4 and 5, the first tube 1 is a combination of an outer tube 5 and the inner tube 7 wih insulating material 9 filled therebetween to assure increased thermal insulation. Material having excellent waterproof properties and resistance to liquified gases such as polyvinyl chloride, copper or the like is suitably employed for the outer tube 5. On the other hand, material having low heat conductivity as well as excellent heat insulating capability or heat conservation capability and waterproof properties such as foamed plastic, glass wool or the like is preferably employed for heat insulating material 9. Both the inner and outer surfaces of the inner tube 7 serving as non heat exchangeable tube may be lined with resin having excellent heat insulating waterproof properties. The inner tube 7 is made of a metallic material such as copper, copper lined aluminum bronze, aluminum lined aluminum bronze or the like.

Since the second tube 3 functions as heat exchangeable tube, it is made of material having extremely high heat conductivity. Material such as copper, copper lined aluminum bronze, aluminum lined aluminum bronze or the like has not only excellent heat conductivity and flexibility but also high resistance to acid, alkali, salt or the like.

Figure 6:
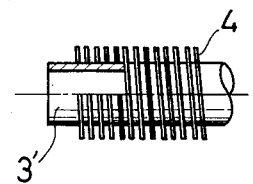
FIG. 6 is a fragmental front view of a second tube which is formed with a number of fins over the outer surface thereof.

To assure that the second tube 3 has an increased heat conduction surface, the second tube 3 may be integrally formed with a number of fins 4 over the outer surface to constitute a fin tube 3', as shown in FIG. 6. Alternatively, it may be integrally formed with a number of fins over the inner surface, as required.

As is apparent from the drawings, the second tube 3 is designed in the spiral configuration which has a certain low inclination angle and a predetermined radius of curvature. Designing of the second tube 3 in that way leads to increased heat conduction area and an amount amount of exchanged heat, thereby resulting in enlarged capability the same tube diameter and same hole depth.

Figure 3:
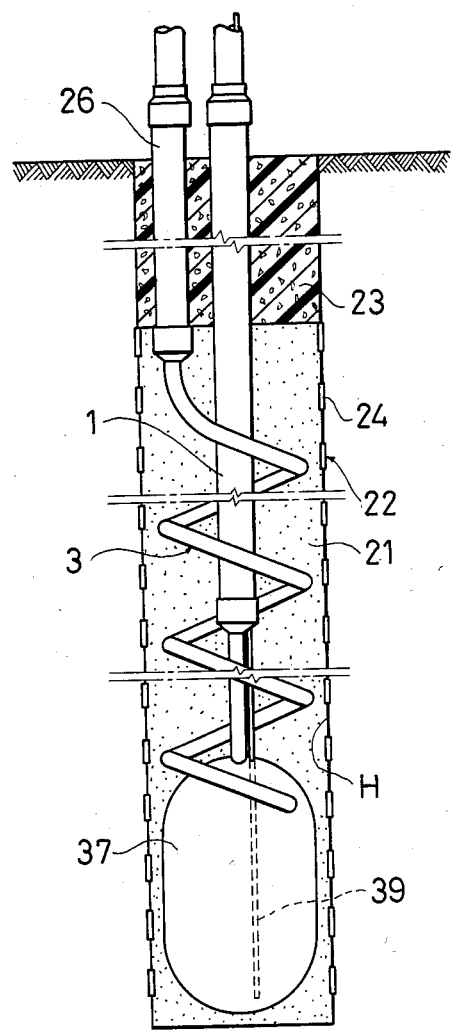
FIG. 3 is a view, similar to FIGS. 1 and 2, of another embodiment in accordance with the present invention.

As shown in FIG. 3, the tubing system constituted by the combination of first and second tubes 1 and 3 is provided with a liquid reservoir 37 at the lowermost end in which liquidized gas is stored. Provision of the liquid reservoir 37 is intended to make it easy to start operation of the apparatus again after operation of the apparatus is interrupted. Further, the apparatus may include a cleaning tube 39 extending from the bottom of the liquid storage 37 up to the ground surface so as to remove foreign material such as dust or the like which is introduced into the recirculating tubing system, as required.

Referring to FIGS. 1 to 3 again, the exposed portion of the first tube 1 on the ground as well as the underground portion of the same having a certain length as measured from the ground surface are designed in the form of heat insulating tube in the same manner as the heat insulating tube 26 of the second tube 3. Since the apparatus of the invention does not utilize the zone where temperature fluctuates significantly as the atmospheric temperature varies, the above-mentioned portion of the first tube 1 is not employed for the purpose of the heat exchanging. As shown in FIGS. 4 and 5, the inner tube 7 constituting the heat insulating tube 26 is provided with a throttle 12. Provision of the throttle 12 in this way makes it easy to transfer liquidized gas under the operative conditions of lower temperature and lower pressure or higher temperature and higher pressure. It is generally known that transference under the operative conditions of lower temperature and lower pressure leads to a heating affect and transference under the operative conditions of higher temperature and higher pressure leads to a cooling affect. Both the first tube 1 and the second tube 3 may be provided with the same or a throttle similar to the one described in the foregoing. It is possible that the throttle 12 is made of metallic material such as shape storable alloy or the like so as to assure that cross-sectional flow area varies in dependence on temperature. The throttle 12 may be made integral with the inner tube 7. Alternatively, it may be designed separate from the inner tube 7 in a streamline shape in such a manner that its fore end part is inserted thereinto, as shown in FIG. 5. Thus, it is possible to reduce a required volume of liquified gas to be contained in the tubing system by inserting the throttle 12 at a predetermined position during the step of fabricating to jointlessly build an inner tube having different diameters. Material constituting the throttle 12 in the form of a tube or plate should not be limited only to shape storable alloy as mentioned above. Alternatively, lead, lead alloy, synthetic rubber or the like may be employed for the throttle 12.

The deep hole H into which the first and second tubes 1 and 3 are inserted is filled with filler material 21 such as sand, gravel, soil or the like, as required. The filler material 21 has two functions, one of them being to prevent hole H from collapsing and the other one being to immovably hold both the first and second tubes 1 and 3 so as to prevent them from floating up due to buoyancy in underground water. In the case where the hole H is not filled with filler material 21, the inlet part of the hold H is closed with shielding material 23 having excellent heat insulating capability or heat conserving and waterproof properties such as foamed plastic or the like in order to prevent heat from entering into or escaping from the hole H. This is because the present invention requires that the hole H is thermally separated from the area located above the ground. For the purpose of practicing the present invention it is preferable that the inside wall of the hole H is lined with a casing 22 having a cylindrical configuration which casing is forcibly driven into the hole H, as shown in FIG. 3. A large number of pores 24 are drilled over the whole surface of the casing 22 whereby underground water flows through them. Thus, the existing tubes 1 and 3 can be replaced and the inside wall of the hole H can be protected safely. The casing may be built by using corrugated plate having similar roundness or the like, resulting in increased mechanical strength of the casing. The latter would be held firmly relative to the inside wall of the hole H. Casing 22 as made in a way that both the first and second tubes 1 and 3 are firmly held relative to the casing 22 are are inhibited from floating up under the influence of buoyancy in underground water.

Both the first and second tubes 1 and 3 are filled with a liquified gas serving as the heat exchanging medium. The heat exchanging medium is caused to recirculate through the tubing system. For instance, ammonia gas, fluorocarbon gas or the like are preferably employable as the heat exchanging medium. Also, gases such as hydrogen, helium, xenon or the like may be mixed with the aforementioned gases to provide the heat exchanging medium.

The projecting parts of the first and second tubes 1 and 3 projecting above the ground surface are connected to a heat exchanging unit 31 including a cooler a, heater or the like. Specifically, both the first and second tubes 1 and 3 are connected to the heat exchanging unit 31 via a recirculating line 30 along which an expansion valve 33. A compressor or recirculating pump 35 or the like is also arranged as required. When the hole H has a deep depth and thereby the first and second tubes 1 and 3 reach a very deep position in the proximity of the bottom of the hole H, the thermal medium in the tubes is caused to recirculate naturally but when the hole has a lesser depth, the medium preferably is forcibly recirculated by operating compressor 35 or the like means.

As the heat exchanging gas is compressed in the gaseous state while it is cooled, it liquifies. On the other hand, as it is heated under reduced pressure, it vaporizes. When the gas is compressed, heat is generated, whereas as when it is held under reduced pressure, heat absorption takes place. It should be noted that variation of pressure as mentioned above is achieved adiabatically.

In the case where the apparatus of the invention is used in a heating cycle including the step of feeding hot water, heat exchanging medium to be recirculated is caused to flow through the second tube 3 and heat in the underground is transferred thereto. Thereafter, it is compressed in the heat exchanging unit on the ground to generate heat. On the other hand, in the case where it is in a cooling cycle including the step of refrigerating, the pressure of the recirculating gas is reduced by means of the heat exchanging unit on the ground surface and thus generated heat is absorbed into recirculating gas. Thereafter, thus absorbed heat is radiated into the underground while the recirculating medium is maintained at the increased pressure state in the second tube 3. As will be readily understood from the above description, transferring of heat into and from the apparatus of the invention is achieved by utilizing the huge heat capacity and the excellent thermal conservation of the underground whereby heat generation and absorption in the heat exchanging unit on the ground are utilized for the purpose of supplying hot water, cooling, heating and refrigerating. Arrows A and B in FIG. 1 designate the preferable flow direction of the heat medium in the heating cycle and the cooling cycle, respectively. However, the present invention is operable by the opposite flow direction mentioned above. A characteristic feature of the invention is that a change from cooling to heating is achieved by automatically shifting the tubing system is dependence on the existing season, for instance, summer season or winter season. Another characteristic feature of the invention is that transportation of both the first and second tubes 1 and the 3 and fitting of them into the underground are easily accomplished because both the first and second tubes 1 and 3 have excellent flexibility.

Finally, FIG. 7 is a schematic vertical sectional view of an apparatus in accordance with another embodiment of the invention wherein the apparatus is utilized for the purpose of supplying hot water with the use of a hot water feeding tank 50. In this embodiment the hot water feeding tank 50 has a heat exchanger 32 incorporated therein and hot water heated up by way of heat exchanging is stored in the hot water feeding tank 50.

As will be readily understood from the above description, thermal energy stored in the underground can be easily utilized in a simple manner by operating the apparatus of the invention. Namely, merely by inserting the first and second tubes into a deep hole in the underground, connecting them to a heat exchanging unit on the ground and then allowing the heat exchanging medium contained in both the first and second tubes to recirculate through the apparatus, thermal energy stored underground can be utilized completely. In other words, excellent thermal conservation and the huge heat capacity underground can be utilized simply and effectively. Obviously, no material underground is consumed by operating the apparatus of the invention but merely heat exchanging is achieved between the underground and the tubing system of the apparatus. Since the underground has an infinite amount of thermal energy, operation of the apparatus leads to effective utilization of nature.

While the present invention has been described above merely with respect to a few preferred embodiments thereof, it should of course be understood that it should not be limited only to them but various changes or modifications may be made in any acceptable manner without departure from the spirit and scope of the invention as defined by the claims.

I claim:

1. An underground heat exchanging apparatus using a heat exchanging fluid existing in gaseous and liquid form during operation of said apparatus, said apparatus comprising
   a first heat insulating tube;
   a second heat exchangeable tube;
   a reservoir connecting said first and second tubes, said reservoir being disposed at the lowermost portions of said tubes and dimensioned to store liquified heat exchanging fluid therein for facilitating start-up of operation of said system;
   said tubes being adapted for insertion into a deep hole bored in the underground, said second tube having a spiral shape which spirally extends about said first tube located at the center of the hole; and
   a recirculating system connecting said first and second tubes, said recirculating system including a heat exchanging unit on the ground surface, said first and second tubes being filled with the heat exchanging fluid.

2. An underground heat exchanging apparatus as defined in claim 1, wherein said second tube is connected to the lower end of the first tube and has a downwardly extended part which is bent backwardly toward the first tube.

3. An underground heat exchanging apparatus as defined in claim 1, wherein said second tube comprises a straight tube connected to the lower end of said first tube and a spirally corrugated tube which forms a spiral passage in the space as defined between said straight tube and said first tube.

4. An underground heat exchanging apparatus as defined in claim 1, wherein said second tube comprises a number of fins over the outer surface thereof which carries out heat exchanging whereby a fin tube is built for the apparatus.

5. An underground heat exchanging apparatus as defined in claim 1, wherein said second tube is made of a metallic material.

6. An underground heat exchanging apparatus as defined in claim 1, wherein said first and second tubes form a tubing system, said tubing system including a throttle therein.

7. An underground heat exchanging apparatus as defined in claim 1, wherein ammonia gas, fluorocarbon gas and a mixture of inert gas are employed as the heat exchanging fluid.

8. An underground heat exchanging apparatus as defined in claim 1, wherrein the upper part of the hole drilled in the underground is closed with heat conserving material or heat insulating material which serves as filler.

9. An underground heat exchanging apparatus as defined in claim 1, wherein the hole drilled in the underground is filled with a filler material after both said first and second tubes are inserted into the hole.

10. An underground heat exchanging apparatus as defined in claim 1, wherein the inside wall of the hole drilled in the underground is lined with a casing having a cylindrical configuration, said casing having a large number of pores therethrough.

* * * * *